Sept. 11, 1956        W. T. NYE        2,762,556
RETRACTABLE HANDLE FOR A CONTAINER
Filed Sept. 28, 1951
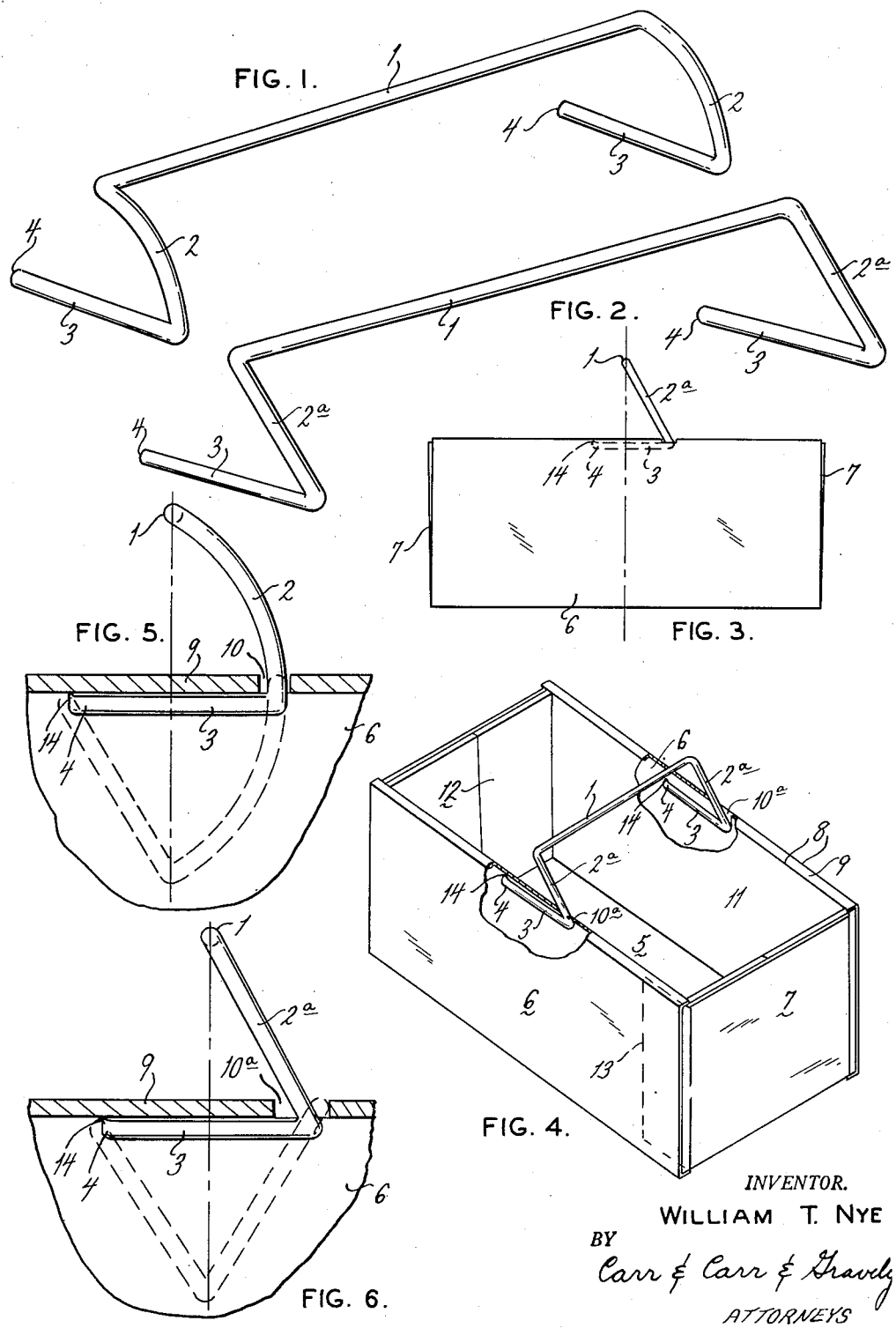
INVENTOR.
WILLIAM T. NYE
BY
Carr & Carr & Gravely
ATTORNEYS United States Patent Office 2,762,556
Patented Sept. 11, 1956

2,762,556

RETRACTABLE HANDLE FOR A CONTAINER

William T. Nye, Richmond Heights, Mo., assignor, by mesne assignments, to Crown Zellerbach Corporation, San Francisco, Calif., a corporation of Nevada Application September 28, 1951, Serial No. 248,818

1 Claim. (Cl. 229—52)

This invention appertains to a handle carrying means for a container, and more particularly to a novel retractable handle suitable to be used with an upwardly opening container constructed of solid fibreboard, corrugated fibreboard or any other suitable material.

The handle carrying device of this invention may be constructed of pliable or bendable wire; however, any other sufficiently rigid material which can be satisfactorily formed into a proper shape may be used and still come within the purview of the invention.

One of the principal objects of this invention is to provide a wire handle for a container which is easily and readily retractable within the container.

Another object of this invention is to provide a handle for a container which is readily retractable within the container when pivoted about a center of rotation within the container.

A further object is to provide a retractable container handle which may be readily used without the requirement of additional material to adapt the container to receive the handle and wherein the handle member requires a minimum of material in its construction.

Another object is to provide a retractable handle for a container which may be inserted or removed at any time regardless of whether the container is loaded or not.

A still further object is to provide a container handle which will automatically retract about a pivot point when other items or containers are stacked on top thereof, and will also readily and automatically extend to a carrying position when grasped by its lifting portion.

These and other objects and advantages will be apparent hereinafter.

This invention comprises a retractable handle for a container, said handle having an upper carrying portion with a depending leg member right angularly disposed from each end thereof, each leg member having a supporting member angularly connected to the lower end thereof. In the carrying position, the lower end of each leg member is disposed within the container through an opening therein and the supporting member is in flatwise relation to the underface of the upper portion of the container body. The handle is retractable within the container by moving it in an arcuate path about the free ends of the supporting members. In the retracted position, the upper carrying portion is disposed against the outer upper face of the container.

The invention also consists in the parts and in the arrangements and combinations of parts hereinafter described and claimed. In the accompanying drawings which form a part of this specification and wherein like numerals and symbols refer to like parts wherever they occur:

Fig. 1 is a perspective view of a preferred form of a handle embodying this invention, Fig. 2 is a perspective view of a modified form of a handle embodying this invention, Fig. 3 is a side elevational view of a fibreboard basket employing the modified form of the container handle, Fig. 4 is a perspective view of a fibreboard basket employing the modified form of the container handle with portions cut out to show clearly the position of the handle within the container in the extended carrying position, Fig. 5 is a fragmentary vertical cross sectional view showing the preferred form of the container handle in the extended carrying position and by dotted lines in the retracted position, and Fig. 6 is a fragmentary vertical cross sectional view of the modified form of the container handle shown in both the extended and the retracted positions.

A preferred form of the handle member embodying this invention made out of wire or other suitable material is shown in Fig. 1, and is provided with a transverse upper bar-like hand grip carrying portion 1 having arcuate leg members or first portion 2 disposed within a vertical plane at right angles to the ends of said carrying portion 1. Each leg member 2 has a supporting member or second portion 3 angularly connected to its lower end. Each supporting member 3 is disposed within the vertical plane which contains its arcuate leg member 2. Each supporting member 3 is substantially straight in shape, having a free end 4. The leg members 2 are arcuate in shape with respect to the centers of the free ends 4 of the supporting members 3.

Fig. 4 shows an upwardly opening fibreboard container which may be used in combination with the preferred embodiment of the handle member herein described. The container has a bottom panel 5 with an opposing pair of upstanding side walls 6 and an opposing pair of end walls 7. The upper edge of each of the side walls 6 is defined by a pair of parallel scores 8 which in turn define the side edges of a flat ledge 9 having a round handle receiving opening 10 therethrough. The parallel scores 8 also define the upper edges of inwardly folded side wall flaps 11 which are positioned parallel to the inner face of the side walls 6. The side wall flaps 11 are provided with end flaps 12 positioned flatwise against the inner face of the end wall 7. The end walls 7 in turn are provided with end members 13 which are positioned in the space between the side walls 6 and the side wall flaps 11.

The circular handle receiving openings 10, as shown in Fig. 5, are disposed in parallel relation any convenient distance from the vertical plane containing the center of gravity of the container. However, in the preferred embodiment the opening is spaced from the vertical plane containing the center of gravity a distance equal to substantially one-eighth the length of the container and the supporting member 3 of the handle member is equal to substantially twice the distance the opening 10 is displaced from the vertical plane of the center of gravity of the container. The arcuate leg members 2 are of sufficient length to position the upper portion of the handle member vertically above the longitudinal center of the container when the handle member is inserted therein, and extended into the carrying position.

The handle member may be inserted into the container by pushing the free ends 4 of the supporting member vertically downwardly through the openings 10 until the entire lengths of the supporting members 3 are within the container. The supporting members 3 are now rotated vertically upward about the lower ends of the legs 2 so that the supporting members 3 are in flatwise relation with the underface of the flat ledge 9. The handle is now in the carrying position. The handle may be readily retracted by pushing the upper carrying portion 1 downwardly to a position against the flat ledge 9. Conversely, the handle may be again extended into the carrying position by lifting the upper carrying portion 1. In so doing the entire handle tends to pivot about the free ends 4 of the supporting members into the proper carrying position.

The preferred embodiment of the handle member described may be modified as shown in Fig. 2 by providing a straight leg member 2a. When the straight leg form of the handle member is used it will be necessary to provide an elongated handle receiving opening 10a as indicated in Figs. 3, 4, and 6 so that the straight leg portion 2 may be pivoted into the container without binding the sides of the elongated handle receiving opening 10a.

Either of the above embodiments may be further modified by providing the free end 4 of the supporting member with an upwardly directed barb 14. The barb 14 is adapted to pivotally engage the underface of the flat ledge 9 to more readily facilitate movement of the handle member in an arcuate path. Obviously the barb 14 is optional and may be omitted if desired.

The dimensions of the handle member and consequently its placement in the top 9 of the container may vary considerably. The openings 10 may be displaced a greater distance from the vertical plane containing the center of gravity of the container thereby requiring a supporting member 3 of greater length in order for the supporting member to be equal to the preferred dimension of at least twice the displacement of the opening 10 from the vertical plane containing the center of gravity of the container. Due to the interdependence of the component parts of the handle the upper carrying portion will thereby be positioned a greater distance above the top of the container when the dimension of the supporting member is lengthened. Thus the carrying portion of the handle may be positioned any convenient distance above the contents of the package.

Regardless of the overall dimensions of the handle member, the size of the components is dependent upon the length of the supporting member which should be long enough to extend from the handle receiving opening to a point at least to and preferably past the vertical plane containing the center of gravity line of the container. In the preferred form, the handle may also be used in a totally enclosed carton or container by forcing the free ends of the supporting member 3 through the walls of a container in a position spaced from but adjacent the center line thereof and positioning the supporting member 3 flatwise against the underface of a container wall, so that the transverse upper carrying portion 1 is vertically above the center of gravity of the container. The handle can thereby be angularly retracted and extended as described hereinbefore.

It is to be understood that the embodiments herein described are illustrative and not restrictive and it is also to be understood that the invention is susceptible of other modified forms.

What I claim is:

In combination a container and a single one-piece wire-like retractable handle associated therewith, the container having a connected together opposed spaced apart wall structure, the handle including an elongated rigid bar-like hand grip portion with substantially similarly formed, outwardly disposed, angular portions extending downwardly from each end of the hand grip portion and in substantially vertical, parallel relationship with each other, each angular portion consisting of a first portion integral with the hand grip portion and laterally disposed with respect to the vertical plane thereof, and a second portion integral with the first said portion and extending through the vertical plane of the hand grip portion right angularly thereto, and with the said second portions inserted through aligned openings in the wall structure spaced from and adjacent to the vertical center of the container and in horizontally disposed contacting relationship with adjacent inner portions of the wall structure and with a part of the second portions extending substantially beyond the vertical center of the container and said vertical plane so that when the handle is elevated above the wall structure the vertical plane of the hand grip portion of the handle is in substantial vertical alignment wtih the vertical center of the container.

References Cited in the file of this patent

UNITED STATES PATENTS

| | | |
|---|---|---|
| 2,123,771 | Crawell | July 12, 1938 |
| 2,132,638 | Mohler | Oct. 11, 1938 |
| 2,518,818 | Ringler | Aug. 15, 1950 |
| 2,524,125 | Whittaker | Oct. 3, 1950 |
| 2,577,001 | Cole | Dec. 4, 1951 |
| 2,586,005 | Colonna | Feb. 19, 1952 |